United States Patent Office 3,657,315
Patented Apr. 18, 1972

3,657,315
PURIFICATION OF ADIPONITRILE
Anton Wegerich, Limburgerhof, Wolfgang Arend, Ludwigshafen, Emil Himmelhan, Heidelberg, and Arnold Wittwer, Ludwigshafen, Germany, assignors to Badische Anilin- & Soda-Fabrik Aktiengesellschaft, Ludwigshafen (Rhine), Germany
No Drawing. Filed Dec. 3, 1969, Ser. No. 881,935
Claims priority, application Germany, Dec. 4, 1968,
P 18 12 525.2
Int. Cl. C07c 121/26
U.S. Cl. 260—465.8      5 Claims

ABSTRACT OF THE DISCLOSURE

Purification of adiponitrile by crystallization from an alkanol having from four to eight carbon atoms. The process is particularly suitable for the purification of adiponitrile containing cyanocyclopentanonimine. Adiponitrile is an intermediate for the production of nylon-6, a fiber intermediate.

---

This invention relates to a process for the purification of adiponitrile by crystallization from a mixture with an alkanol having at least four carbon atoms.

It is known from U.S. Pat. 3,370,082 that adiponitrile can be purified by crystallization from a melt thereof. Although purification is achieved by this method, it is not satisfactory in the case of strongly contaminated adiponitrile, particularly adiponitrile having a content of more than 0.5% of cyanocyclopentanonimine. When crystallization is repeated several times (as is necessary in such cases in order to obtain good yields) the mother liquors become so strongly enriched in impurities that pure product can no longer crystallize out from the solutions although large amounts of adiponitrile may still be contained therein which can only be recovered partially in a troublesome way by fractional distillation. The impurities consist mainly of amines and resinous polymers with or without cyclopentanone, cyanocyclopentanonimine, cyanocyclopentanone, methylglutaronitrile and amides.

It is also known that adiponitrile can be purified by crystallization from a mixture of the same with methanol (Netherlands patent application 6705905). A temperature of from −15° C. to −30° C. has to be maintained during crystallization and this makes the method complicated and expensive. Since adiponitrile has good solubility in methanol, a satisfactory yield is only obtainable by a troublesome procedure in the case of strongly contaminated adiponitrile, particularly adiponitrile containing cyanocyclopentanonimine.

It is an object of the invention to provide a new and efficient process for the purification of adiponitrile and particularly of adiponitrile contaminated by cyanocyclopentanonimine.

This and other objects and advantages of the invention will be better understood from the following detailed description of the invention.

We have found that adiponitrile which is contaminated with cyanocyclopentanonimine can be advantageously purified by crystallization from a solvent when crystallization is carried out from a liquid mixture of such an adiponitrile and an alkanol having four to eight carbon atoms which is liquid at the crystallization temperature of adiponitrile, and the crystals are separated.

As compared with prior art methods the process according to this invention is easier to carry out and in some cases gives adiponitrile in better yields and purity. Purification by crystallization with alkanols having four to eight carbon atoms in accordance with the invention may be carried out in the presence of larger amounts of impurities without distillation of the mother liquors.

The adiponitrile to be purified contains as a rule more than 0.5% by weight of cyanocyclopentanonimine but it should not contain more than 5% of cyanocyclopentanonimine and in all not more than 12% by weight of other impurities such as cyclopentanone, cyanocyclopentanone, methylglutaronitrile, unidentified amines and resinous polymers.

The adiponitrile used as starting material may have been prepared by any prior art method. Adiponitrile which has been obtained from 1,4-dichlorobutane and an alkali metal cyanide or from adipic acid and ammonia at elevated temperature in contact with water-eliminating catalysts or by hydrogenating dimerization of acrylonitrile by means of sodium amalgam or which has been obtained electrolytically may be used as may adiponitrile which has been prepared by hydrogenation of dihydromucononitrile.

Those skilled in the art will be aware that the dinitrile may be subjected to preliminary purification by conventional methods, for example by treatment with acids, solutions of acid salts, for example sodium bisulfate, or with oxidizing agents, for example nitric acid, potassium permanganate, or absorbents, for example active carbon, aluminum oxide or silica gel, or by ion exchangers, treatment with solid sodium bisulfate followed by separation of the solid residue or by a simple distillation, so that for example impurities which have a lower or higher boiling point than adiponitrile and nondistillable products are removed.

Similarly adiponitrile which has been purified by the above-mentioned prior art methods may be subjected to the purification by the process according to the invention. It is also advantageous to combine the methods by uniting the mother liquors and washing liquids obtained in the purification described in U.S. Pat. 3,370,082 with an alkanol having four to eight carbon atoms, allowing the adiponitrile still contained in the mother liquors to crystallize out by the process according to the invention and separating it.

The process may also be used for the purification of adiponitrile which contains less than 0.5% by weight of cyanocyclopentanonimine, but then the advantages over prior art methods are less.

A liquid mixture of adiponitrile and an alkanol which is liquid at the crystallization temperature of adiponitrile and which has four to eight, particularly five to six, carbon atoms is used for the purification. Appropriate mixtures of alkanols may also be used for the purification of the dinitrile. The following are examples of suitable alkanols: n-amyl alcohol, n-butyl alcohol, isobutanol, sec-butyl alcohol, isoamyl alcohol, n-hexyl alcohol, 2-n-octanol and 2-ethyl hexanol. The alkanol is generally used in an amount of from 20 to 80%, preferably from 30 to 60%, by weight with reference to the adiponitrile to be purified.

The adiponitrile to be purified is united as such or if desired in the form of mother liquor or wash liquid with the alkanol and the liquid mixture is cooled to the crystallization temperature of the dinitrile. The crystallization temperature depends particularly on the amount and nature of the impurities and on the alkanol used and as a rule is between +2.6° and −18° C., preferably from 0° to −8° C. Crystallization may be carried out continuously or in batches, at atmospheric or superatmospheric pressure, for example at 5 atmospheres. Adiponitrile crystallizes out from the cooled mixture and crystallization may be promoted in known manner, for example by using scraper crystallizers, evaporator crystallizers, roller crystallizers, screw crystallizers, or by inoculation of the mixture with solid crystals of dinitrile. To achieve well-formed crystals it is often advantageous to let the suspension of crystals remain, either in the crystallizer or in a special hold tank, for some time, for example one to five hours, at the crystallization temperature while stirring. Separation of the crystals from the mother liquor may be carried out in conventional separating equipment, for example filter presses, vacuum filters, pressure filters or centrifuges of various designs. The filtered material may be freed from adherent mother liquor by washing with pure adiponitrile, for example by the methods described in U.S. Pat. 3,370,082 or advantageously by washing with the alkanol used. The wash liquids may be united with the mother liquor and again subjected to crystallization in the manner described. By the said processing of the mother liquors and wash liquids by repeated crystallization, almost the whole of the dinitrile can be separated in pure form. The dinitrile obtained may have from about 1 to 20% by weight of alkanol adhering to it, depending on the washing treatment, and this may be separated by distillation if necessary.

The compound obtainable by the process according to the invention is a valuable starting material for the production of synthetic fibers and plastics.

The invention is illustrated by the following examples. The parts specified in the examples are parts by weight.

EXAMPLE 1

A mixture of 700 parts of crude 95% by weight adiponitrile which has been distilled off from the residue (prepared by reaction of adipic acid with ammonia and still containing 0.7% by weight of cyanocyclopentanonimine) and 300 parts of n-amyl alcohol is crystallized in a stirred vessel with external cooling until a mash is formed which is just capable of being stirred. The temperature of the mash is then about −3° C. After the mixture has been stirred for an hour the crystals are suction filtered and washed with 200 parts of pure adiponitrile cooled to about 8° C. 430 parts of crystalline product is obtained. (Fraction (I).)

The mixture of filtrate and wash solution (770 parts) is crystallized as described above (but at about −3.3° C.) and filtered off. The filtered material is washed with 160 parts of pure adiponitrile. 330 parts of crystalline product is obtained. (Fraction (II).)

In a third crystallization of the 600 parts of mixture of filtrate and wash solution at about −3.6° C., another fraction (III) of 250 parts of crystalline product is obtained which is washed with 120 parts of adiponitrile.

The three fractions ((I) to (III)) of crystals amounting in all to 1010 parts contain 10 parts of amyl alcohol which is separated by distillation at 150° C. and about 10 torr. The adiponitrile remaining has a purity of more than 99.9% and may be used immediately for hydrogenation into hexamethylenediamine. The yield is 520 parts with reference to the dinitrile to be purified deducting the amount used for washing.

The mother liquor remaining (470 parts) is cooled to about −7° C. 163 parts of crystalline product is thus obtained which contains (apart from adiponitrile) 6 parts of impurities of high boiling point and 25 parts of amyl alcohol. This fraction of crystals may be used with fresh crude adiponitrile in a later crystallization. The residual mother liquor (317 parts) contains (apart from amyl alcohol) 42 parts of constituents of higher boiling point of which 13 parts is adiponitrile. This is equivalent to a loss of about 2% of the amount used. The amyl alcohol can be recovered by distillation and used again.

EXAMPLE 2

A mixture of 700 parts of mother liquor (containing 90% by weight of adiponitrile and 1.5% by weight of cyanocyclopentanonimine) obtained as a filtrate in the process according to U.S. Pat. 3,370,082 has 300 parts of amyl alcohol added to it and is then crystallized as described in Example 1. 400 parts of crystalline product (Fraction (I)) is obtained at about −3.4° C. and is washed with 200 parts of pure adiponitrile. Another fraction (II) is obtained by crystallization from the mother liquor and wash solution (800 parts); this is filtered off at −3.6° C. and washed with 170 parts of pure adiponitrile. The two fractions (I) and (II) are adiponitrile containing 1% by weight of amyl alcohol. The adiponitrile is obtained in more than 99.9% purity by distilling off the amyl alcohol under subatmospheric pressure. The yield (after deduction of the amount of adiponitrile used as wash liquid) is 366 parts of crystalline product.

The residual mother liquor is cooled to about −8° C. together with the wash solution (630 parts in all). 326 parts of crystalline product is obtained which contains (in addition to adiponitrile) 31 parts of impurities and 61 parts of amyl alcohol. This can be used together with melt crystallization mother liquor (starting mixture) in the next crystallization. The remaining residual mother liquor (304 parts) contains (apart from n-amyl alcohol) 69 parts of high boiling constituents of which about 31 parts is adiponitrile. Loss in after-crystallization is therefore about 5% of the amount of adiponitrile used.

EXAMPLE 3

A procedure analogous to that in Example 1 is adopted but using n-amyl alcohol as the wash liquid instead of pure adiponitrile. A total of 530 parts of crystalline product is obtained. Another crystal fraction with 123 parts of adiponitrile is obtained in a second batch. 12 parts of adiponitrile (1.8% of the theory) remains in the residual liquor and is discarded.

We claim:
1. In a process for the purification of a crude adiponitrile contaminated by more than 0.5% up to about 5% by weight of cyanocyclopentanonimine and up to not more than 12% by weight of other impurities including cyclopentanone, cyanocyclopentanone, methylglutaronitrile, amines and resinous polymers, by crystallizing said adiponitrile at its crystallization temperature, the improvement which comprises crystallizing the adiponitrile out from its liquid mixture with an alkanol of 4 to 8 carbon atoms, said alkanol being present in said liquid mixture in an amount of 20 to 80% by weight with reference to the adiponitrile.

2. A process as claimed in claim 1 wherein said crystallization is carried out at a temperature of between +2.6° C. and −18° C.

3. A process as claimed in claim 1 wherein said crystallization is carried out at a temperature of between 0° C. and −8° C.

4. A process as claimed in claim 1 wherein the alkanol used has from five to six carbon atoms.

5. A process as claimed in claim 1 wherein the said percentage is from 30 to 60%.

References Cited

UNITED STATES PATENTS

| | | | |
|---|---|---|---|
| 2,920,099 | 1/1960 | Ringwald | 260—465.8 |
| 3,370,082 | 2/1968 | Eisfeld et al. | 260—465.8 |

JOSEPH PAUL BRUST, Primary Examiner